C. H. MADDOX.
TIRE ARMOR.
APPLICATION FILED SEPT. 12, 1910.
1,025,285.
Patented May 7, 1912.
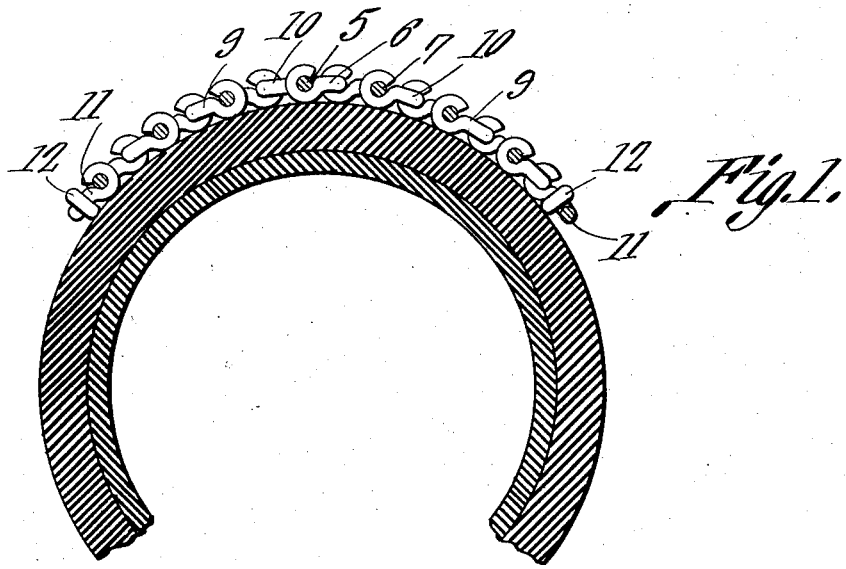
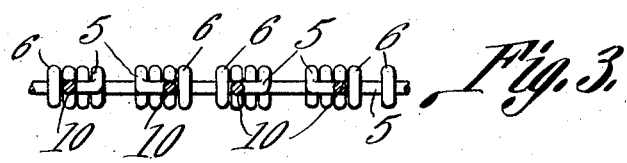
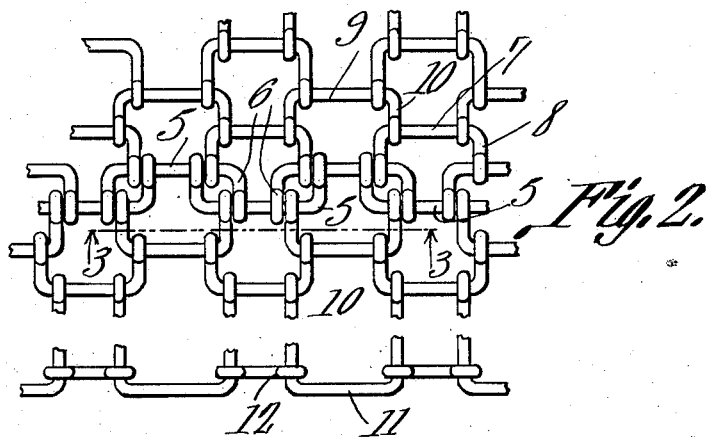
Charlie H. Maddox,
Inventor
by C. A. Snow & Co.
Attorneys
Witnesses

UNITED STATES PATENT OFFICE.

CHARLIE H. MADDOX, OF CANTON, MISSOURI.

TIRE-ARMOR.

1,025,285. Specification of Letters Patent. Patented May 7, 1912.

Application filed September 12, 1910. Serial No. 581,512.

*To all whom it may concern:*

Be it known that I, CHARLIE H. MADDOX, a citizen of the United States, residing at Canton, in the county of Lewis and State of Missouri, have invented a new and useful Tire-Armor, of which the following is a specification.

The object of the present invention is to provide an improved tire armor of the chain type.

One of the primary aims of the present invention is to so construct and connect the links of the armor that the points of connection between the links will be of greater number at the lengthwise middle of the armor than at the sides thereof so that greater protection will be afforded the tire at its true tread.

With the above and other objects in view, the invention consists in the general construction and arrangement of parts shown in the accompanying drawings, in which, Figure 1 is a cross sectional view through a vehicle tire showing the armor applied thereto in cross section. Fig. 2 is a plan view of a section of the armor. Fig. 3 is a sectional view on the line 3—3 of Fig. 2 looking in the direction indicated by the arrow.

As before stated, the armor embodying the present invention is made up of a plurality of connected links and of these links, certain ones are indicated by the numeral 5 and each of the links 5 includes a connecting portion and end portions which extend at right angles from the connecting portion and are indicated by the numeral 6. In assembling these links, the end portions of the links are bent pivotally about the connecting portions of two adjacent ones of the links and adjacent ends of each two adjacent links are bent pivotally about the connecting portion of the next adjacent ones of the links. Other ones of the links indicated by the numeral 7 include a connecting portion and spaced end portions and the said end portions, indicated by the numeral 8, are bent pivotally about the connecting portions of adjacent ones of the links 5 and in a like manner, links 9 have their end portions 10 bent pivotally about the connecting portions of the links 8, and so on to the outer or side edges of the armor, the outermost links being indicated by the numeral 11 and having their end portions connected by short links 12. The armor is thus completed and it will be observed that owing to the peculiar arrangement of the links 5 and the fact that these links are so arranged as to have their ends presented toward the lengthwise middle of the armor from each side, the points of connection between the said links will be of greater number at the lengthwise middle of the armor than at either side and consequently greater protection will be afforded the true tread of the tire or more specifically speaking that portion of the tread which is certain to come into contact with the road surface.

What is claimed is:—

1. Tire armor comprising links having a connecting portion and end portions extending at an angle from the connecting portion, each link having its end portions bent pivotally around the connecting portions of adjacent links, the said end portions of the links having their terminals presented toward the longitudinal median line of the armor at each side thereof.

2. Tire armor comprising a plurality of series of links having a connecting portion and end portions extending at an angle from the connecting portion, the said ends of the links being bent pivotally about the connecting portions of two adjacent links and said adjacent links having their adjacent ends bent pivotally about the connecting portion of the said link, and other links shorter than the first mentioned links and having each a connecting portion and end portions extending at an angle from the connecting portion and bent pivotally about the connecting portions of adjacent ones of the first mentioned links.

In testimony that I claim the foregoing as my own, I have hereto affixed my signature in the presence of two witnesses.

CHARLIE H. MADDOX.

Witnesses:
J. B. McCUTCHAN,
R. M. BOULWARE.

Copies of this patent may be obtained for five cents each, by addressing the "Commissioner of Patents, Washington, D. C."